(12) United States Patent
Morimatsu

(10) Patent No.: US 6,836,048 B2
(45) Date of Patent: Dec. 28, 2004

(54) COIL WINDING ARRANGEMENT FOR ELECTRICAL MACHINE

(75) Inventor: Masaki Morimatsu, Shuuchi-gun (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/604,540

(22) Filed: Jul. 29, 2003

(65) Prior Publication Data

US 2004/0178690 A1 Sep. 16, 2004

(30) Foreign Application Priority Data

Aug. 9, 2002 (JP) ........................................ 2002-233129

(51) Int. Cl.⁷ ................................................. H02K 1/00
(52) U.S. Cl. ........................ 310/198; 310/179; 310/184
(58) Field of Search ................................ 310/198, 179, 310/184

(56) References Cited

U.S. PATENT DOCUMENTS

| | | | | | |
|---|---|---|---|---|---|
| 4,100,444 | A | * | 7/1978 | Boyd, Jr. .................... | 310/184 |
| 4,833,355 | A | * | 5/1989 | Kawashima ................ | 310/198 |
| 5,334,894 | A | * | 8/1994 | Nakagawa ................. | 310/49 R |
| 5,606,208 | A | * | 2/1997 | Sakashita et al. ............ | 310/71 |
| 6,573,629 | B1 | * | 6/2003 | Morimatsu .................. | 310/166 |
| 6,583,529 | B2 | * | 6/2003 | Suzuki et al. ............... | 310/199 |
| 6,686,761 | B2 | * | 2/2004 | Pan et al. .................... | 324/772 |
| 6,700,276 | B2 | * | 3/2004 | Hakamata ................... | 310/179 |

FOREIGN PATENT DOCUMENTS

JP 10146030 A * 5/1998 .......... H02K/21/16

* cited by examiner

Primary Examiner—Joseph Waks

(57) ABSTRACT

An armature construction for an electrical machine that permits a wide latitude is selecting the coil groupings without changing the basic construction of the armature and without requiring relocation of the wire taps or the provision of a large number of such taps.

15 Claims, 3 Drawing Sheets

COIL WINDING ARRANGEMENT FOR ELECTRICAL MACHINE

BACKGROUND OF INVENTION

This invention relates to a coil winding arrangement for an electrical machine that permits greater latitude in the machine operation while maintaining a simple, low cost construction.

There are many instances where different windings or groups of windings are employed in an electrical machine that cooperate with the same magnets to serve different purposes. For example, in rotating electrical generators one group of coil windings may have a rectified output for charging a battery while another group may be employed for operating electrical devices directly. This is common in many vehicle applications such as various two or three wheeled land vehicles. When this is done, some mechanism must be employed for providing the electrical connections between the groups of coils and the device or devices powered.

Generally the windings are formed around the pole teeth of an armature that cooperates with juxtaposed relatively moveable permanent magnets of alternating polarity. These magnets are positioned at the ends or the pole teeth that are spaced from the connecting ring from which the teeth extend in a radial direction. The windings are formed around insulating bobbins that surround the pole teeth. Generally the terminal connections are made to taps supported at the base of the bobbins.

If, as is normal, the coils of each group of windings are around circumferentially adjacent pole teeth and thus the taps for the winding ends may be placed in proximity to the beginning coil and final coil of each group. However, the number of pole teeth or coil windings for each group will vary, depending on the specific application. Thus a special bobbin assembly must be made for each application, thus increasing the piece price.

An alternate solution is shown in U.S. Pat. No. 6,583,529, issued Jun. 24, 2003 and assigned to the assignee hereof. In that case there are provided a plurality of taps and special connectors that may be utilized to change the coil groupings. This is a good solution to the problem, but still has some cost disadvantages since multiple taps and special connectors are required.

It is, therefore a principle object of this invention to provide an improved coil winding arrangement for a rotating electrical machine that permits selective grouping of coil windings with a minimum number of electrical taps for their connection.

In the past and as noted above, the grouping of coil windings has been on separate pole teeth. This somewhat limits the flexibility in selecting the groups and may at times limit the total machine capacity through a reduction in the winding density.

It is therefore another principle object of the invention to provide a winding arrangement that has greater flexibility in winding selection than heretofore available.

SUMMARY OF INVENTION

A first feature of the invention is adapted to be embodied in a coil winding arrangement for a rotating electrical machine comprising a ring having a plurality of radially extending pole teeth. A first coil winding having individual coils encircles a first number of circumferentially spaced pole teeth. In accordance with this feature of the invention, a second coil winding encircles a second number of circumferentially spaced pole teeth including at least some of the pole teeth encircled by said first coil winding.

A second feature of the invention is adapted to be embodied in a coil winding arrangement for a rotating electrical machine comprising a ring having a plurality of radially extending pole teeth. A first coil winding having individual coils encircles a first number of circumferentially spaced pole teeth. A second coil winding encircles a second number of circumferentially spaced pole teeth. In accordance with this feature of the invention, four taps are formed at the ring portion to which respective ends of said coil windings are electrically connected. Two of these taps are disposed adjacent to two circumferentially adjacent pole teeth each of which is encircled by a respective one of the coil windings. These two taps are electrically connected to a respective end of the coil winding of the adjacent pole teeth. The remaining two of the taps are disposed adjacent to one pole tooth encircled by at least one of the coil windings. Each of these remaining two taps are electrically connected to the other ends of a respective one of the coil windings.

DETAILED DESCRIPTION

Figure 1:
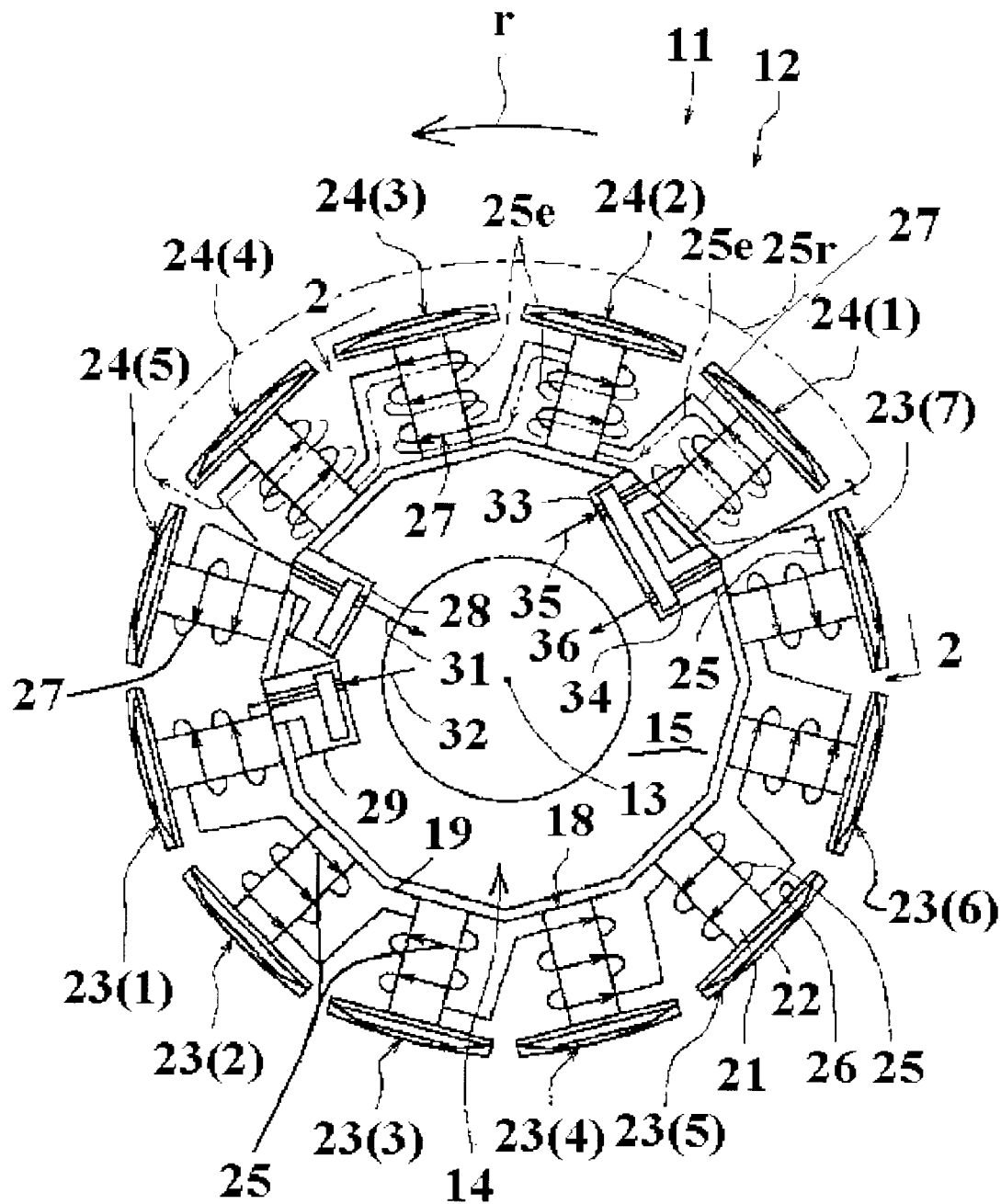
FIG. 1 is a side elevational view of an armature of a rotating electrical machine constructed in accordance with an embodiment of the invention.

Referring now in detail to the drawings, a rotating electrical machine is shown only partially and is indicated generally by the reference numeral 11. The specific machine illustrated may comprise an electrical generator driven by the shaft of an internal combustion engine (not shown) that powers a vehicle such as a small two or three wheeler. Of course those skilled in the art will readily understand that the invention is not limited to such applications or machines.

Since the invention relates to the coil winding of the armature of the machine 11, only this element is illustrated and is indicated generally by the reference numeral 12. In the illustrated embodiment the armature is suitably fixed against rotation and cooperates with a rotor (not shown) that is journalled for rotation about an axis indicated at 13.

The armature 12 is comprised of a core, indicated generally at 14, having a ring shaped portion 15 from which a plurality of pole teeth 16, extend radially outwardly. In the illustrated example there are twelve (12) pole teeth 16. The ring portion 15 has a central opening 17 through which the engine shaft (not shown) that drives the aforementioned rotor passes in a manner well known in the art. Although not illustrated as such, the armature core 14 is preferably formed from a plurality of laminated ferromagnetic sheets.

The tips of the pole teeth 16 are in confronting relation to a plurality of circumferentially spaced permanent magnets (not shown) of alternating polarity. These magnets, as is well known in the art, are affixed to the inner surface of a cylindrical portion of the aforementioned rotor. The rotor rotates in a direction indicated by the arrows "r" in FIGS. 1 and 2.

An insulating bobbin assembly, indicated generally by the reference numeral 18 is provided in partially encompassing relation to the armature core 14. This bobbin 18 includes a ring portion 19 that overlies a portion of the core ring portion 15 adjacent the pole teeth 16. From this portion 19 pole tooth surrounding portions 21 extend around the pole teeth 16. For ease of manufacturing and assembly, the bobbin assembly 18 may be made from split, mating halves. An enlarged protrusion 22 extends both axially and circumferentially from the pole tooth surrounding portions 21. The construction as thus far described may be of any conventional or desired type.

In order to facilitate understanding of the invention, each of the pole teeth 16, the surrounding bobbin portion 21 and the respective winding arrangement (to be described next) are indicated generally by a reference numeral. In the illustrated embodiment, these pole teeth assemblies are divided into two groups with the assemblies one group of which is indicated generally by the reference numerals 23 and those of the other group indicated generally by the reference numerals 24. Although two groups are described and illustrated, it will be understood by those skilled in the art that a greater number of groups may be provided if a greater number of electrical groups are desired.

In the embodiment illustrated as an example, the group 23 consists of seven (7) pole teeth 16, bobbin portions 21 and windings (to be described) while the group 24 consists of five (5) pole teeth 16, bobbin portions 21 and windings (to be described). Also in this embodiment the assemblies 23 and 24 of each group are circumferentially adjacent each other. Again it will be obvious to those skilled in the art that other arrangements are possible, but the use of adjacent teeth simplifies the winding, as will become apparent.

The teeth in each group are identified by subscripts numbered sequentially in the direction of rotation "r" as 23(1), 23(2), 23(3) . . . 23(n) and 24(1), 24(2), 24(3) . . . 24(n). A first coil winding group 25 formed from a wire strand is wound beginning at the pole tooth assembly 23(1) in opposite directions around succeeding pole teeth 23 to the pole tooth 23(7). The winding around these pole teeth 23(1) to 23(7) is sufficient to fill the entire space around the lower surface 26 of the bobbin projections 22 to insure maximum utilization of the available space. As will become apparent shortly, the winding of the strand 25 does not terminate at the tooth 23(7).

A second coil winding group 27 formed from a wire strand is wound beginning at the tooth assembly 24(1) in opposite directions around succeeding teeth 24 to the tooth 24(5). Unlike the winding 25 the winding 27 around the teeth 24(1) to 24(4) is not sufficient to fill the entire space around the lower surface 26 of the bobbin projections 22. The reason for this will become apparent shortly. In the illustrated embodiment only the final tooth 24(5) is fully wound by only the winding 27, but those skilled in the art will readily understand that the number of teeth 24 that are fully wound may be varied as desired.

The winding 25 is extended, as shown by the phantom line portion 25e, and overlies the winding 27 on the teeth 24(1) through 24(4) to completely fill the space below the bobbin surfaces 26. It should also be noted that these extended winding portions 25e are in the same direction as the windings 27 on the same pole tooth 24.

The manner of connecting the ends of the windings to the external loads will now be described. From this description it will become apparent how the terminal end connection of the invention reduces the number of taps required without reducing the effectiveness of varying the ratio between the number of windings for each group.

Figure 2:
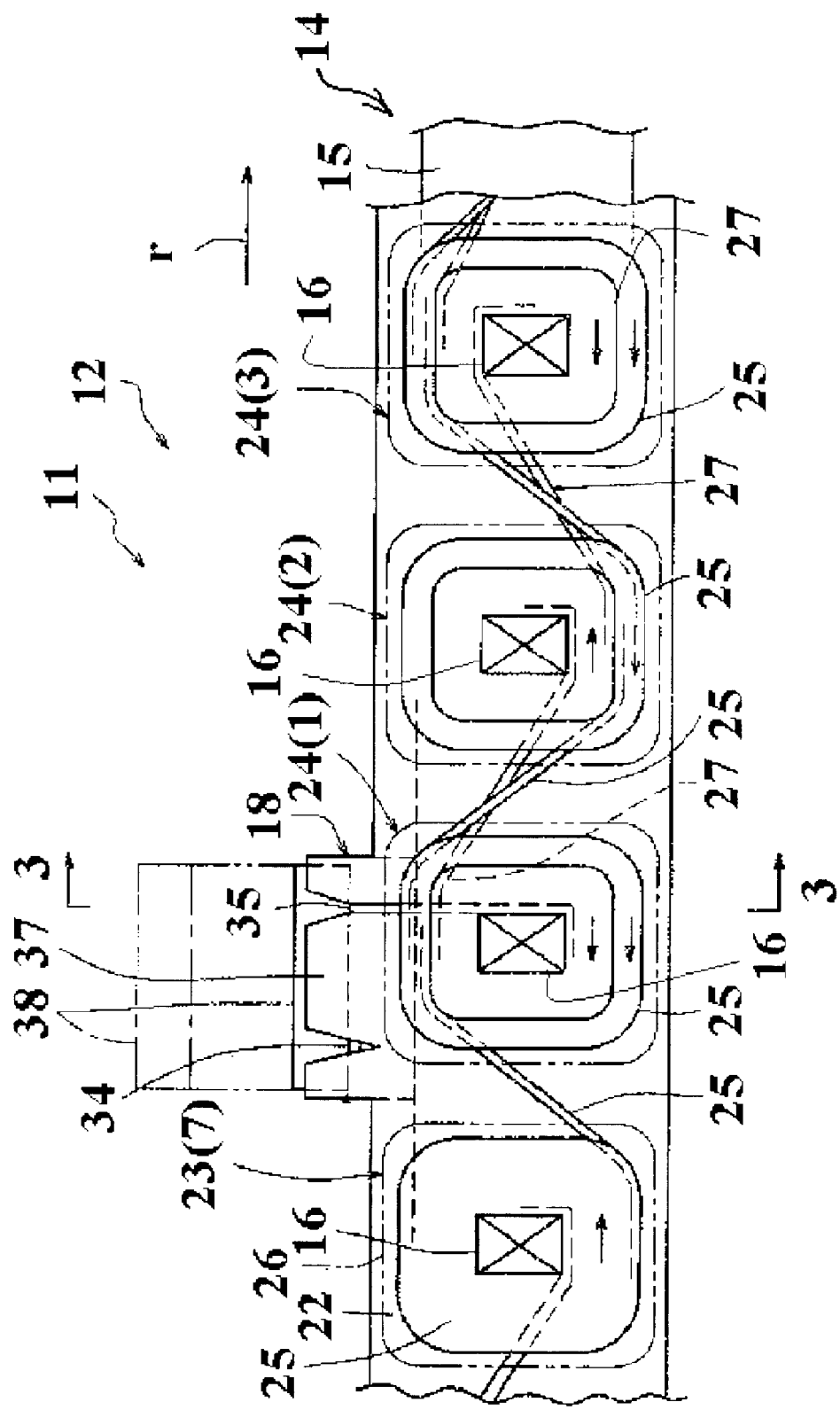
FIG. 2 is an enlarged developed view looking in the direction of the line 2—2 in FIG. 1
Figure 3:
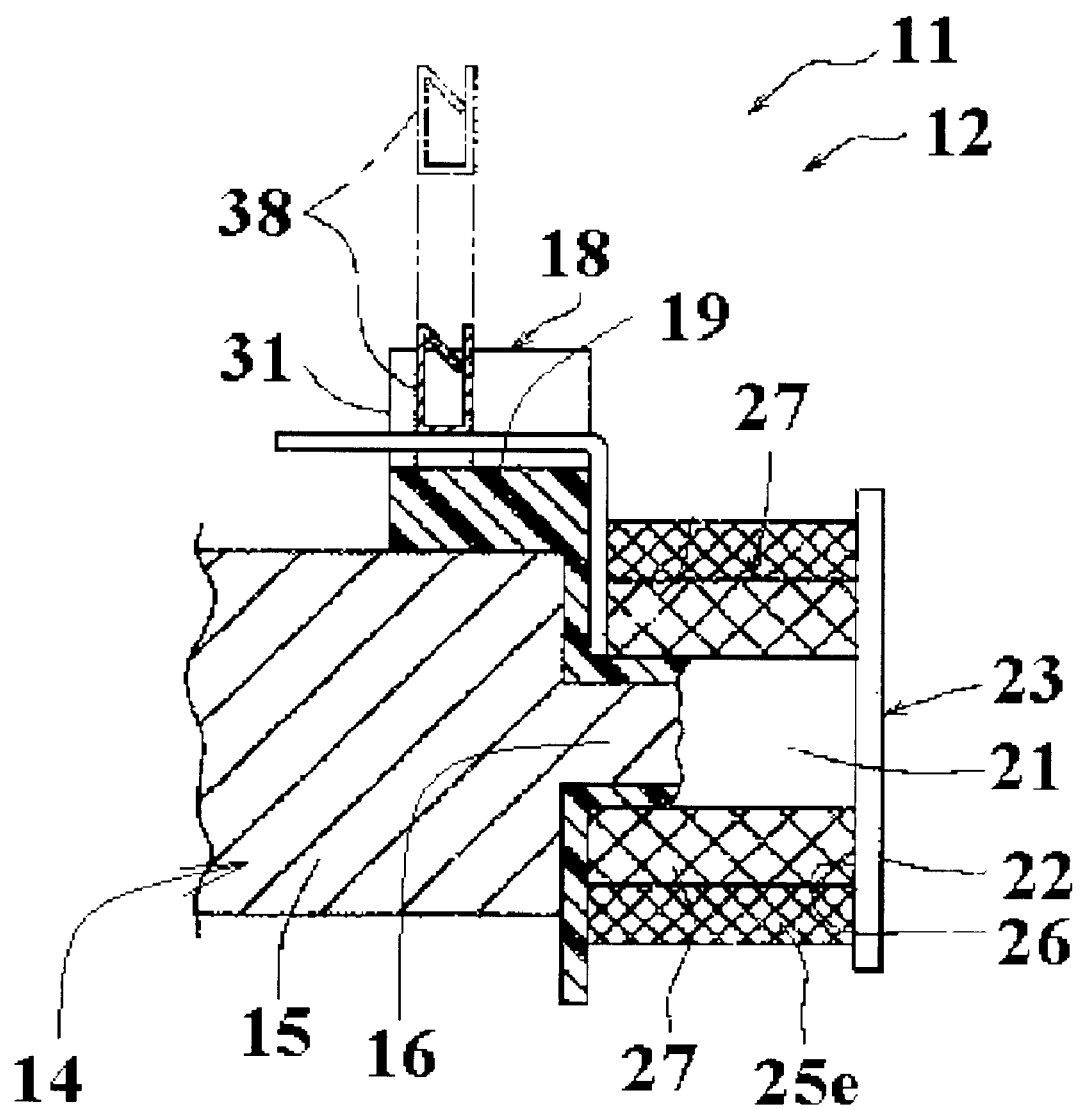
FIG. 3 is a cross sectional view taken along the line 3—3 of FIG. 2.

A pair of first terminal taps 28 and 29 are provided on the bobbin portion 19. The first of these 28 is located adjacent the pole tooth on which the last coil winding 27 of the pole group 24 (that on the pole tooth24(5)). The end of this winding is captured as seen in FIGS. 2 and 3 for the external connection (not shown). The other tap 29 of this pair is located adjacent the pole tooth on which the first coil winding 25 of the pole group 23 (that on the pole tooth23 (1)). Again the end of this winding is captured as seen in FIGS. 2 and 3 for the external connection (not shown). These external connections are indicated schematically by the arrows 31 and 32 respectively.

A second pair of taps 33 and 34 are provided in a common connecting arrangement provided in the bobbin portion 19 adjacent the pole tooth 24(1) that is the first pole tooth in the direction of rotation on which both the windings 25 and 27 lie. Thus the tap 33 receives the terminal end of the winding 27, completing the external connections for this winding 27.

On the other hand the end winding of the extension 25e on the pole tooth 24(4) is circumferentially spaced therefrom. Therefore to simplify the tap location, the extension 25e is provider with a return portion 25r that goes back for connection to the tap 34 to complete the circuit for the winding 25. These taps 33 and 34 receive the external connections are indicated schematically by the arrows 35 and 36 respectively.

The taps for the wire ends will now be described by reference to FIGS. 2 and 3. Each of the taps 28, 29 31 and 32 is formed by a slot indicated by the respective tap number in a projecting flange 37 of the bobbin portion 19. The tap slots 28 and 29 are each formed in their own projections while the tap slots 34 and 35 are formed in spaced relation in the same bobbin flange. Crimp type retainers 38 retain the winding ends in the respective slots as well as the connecting wires of the external loads. In the case of the windings 25 on the poles 23(1) to 23(7) and 24(1) to 24(4) and the taps 28 and 33 this may be electrical loads of the engine and associated vehicle through the connections 31 and 35 shown in FIG. 1. The ends of windings 27 on the pole teeth 24(1) to 24(5) in the taps 29 and 34 may be connected to a rectifying circuit (not shown) for charging the vehicle battery through the connections 32 and 36.

Thus from the foregoing description it should be readily apparent that the described construction permits a wide latitude in selecting the coil groupings without changing the basic construction of the armature and without requiring replacement of the wire taps or the provision of a large number of such taps. Of course those skilled in the art will readily understand that the foregoing description is that of preferred embodiments and that various changes and modifications may be made without departing from the spirit and scope of the invention, as defined by the appended claims.

What is claimed is:

1. A coil winding arrangement for a rotating electrical machine comprising a ring having a plurality of radially extending pole teeth, a first coil winding having individual coils encircling a first number of circumferentially spaced pole teeth and a second coil winding encircling a second number of circumferentially spaced pole teeth including at least some of the pole teeth encircled by said first coil winding.

2. A coil winding arrangement for a rotating electrical machine as set forth in claim 1 wherein the pole teeth encircled by the respective first and second coil windings are adjacent each other.

3. A coil winding arrangement for a rotating electrical machine as set forth in claim 1 wherein the total number of windings on each of the pole teeth is the same.

4. A coil winding arrangement for a rotating electrical machine as set forth in claim 3 wherein the total number windings on the pole teeth are sufficient to minimize the air gap between the respective, adjacent windings.

5. A coil winding arrangement for a rotating electrical machine as set forth in claim 1 wherein there are a number of taps formed at the ring portion to which respective ends of the coil windings are electrically connected.

6. A coil winding arrangement for a rotating electrical machine as set forth in claim 5 wherein two of the taps are disposed adjacent to two circumferentially adjacent pole teeth encircled by only one of the coil windings and are electrically connected to the respective ends of the coil winding of the adjacent pole tooth.

7. A coil winding arrangement for a rotating electrical machine as set forth in claim 5 wherein two of the taps are disposed adjacent to one pole tooth encircled by only both of the coil windings and each tap is electrically connected to one end of a respective one the coil windings.

8. A coil winding arrangement for a rotating electrical machine as set forth in claim 7 wherein one of the taps is electrically connected to an extension of the coil winding formed around a pole tooth circumferentially spaced from the pole tooth where the tap is located.

9. A coil winding arrangement for a rotating electrical machine as set forth in claim 8 wherein the remaining two of the taps are disposed adjacent to two circumferentially adjacent pole teeth encircled by only one of the coil windings and are electrically connected to the respective ends of the coil winding of the adjacent pole tooth.

10. A coil winding arrangement for a rotating electrical machine as set forth in claim 9 wherein the pole teeth encircled by the respective first and second coil windings are adjacent each other.

11. A coil winding arrangement for a rotating electrical machine as set forth in claim 9 wherein the total number of windings on each of the pole teeth is the same.

12. A coil winding arrangement for a rotating electrical machine as set forth in claim 11 wherein the total number windings on the pole teeth are sufficient to minimize the air gap between the respective, adjacent windings.

13. A coil winding arrangement for a rotating electrical machine as set forth in claim 12 wherein the pole teeth encircled by the respective first and second coil windings are adjacent each other.

14. A coil winding arrangement for a rotating electrical machine comprising a ring having a plurality of radially extending pole teeth, a first coil winding having individual coils encircling a first number of circumferentially spaced pole teeth and a second coil winding encircling a second number of circumferentially spaced pole teeth, four taps formed at said ring portion to which respective ends of said coil windings are electrically connected, two of said taps being disposed adjacent to two circumferentially adjacent pole teeth each encircled by a respective one of said coil windings and electrically connected to a respective end of the coil winding of the adjacent pole teeth, the remaining two of said taps being disposed adjacent to one pole tooth encircled by at least one of said coil windings and each of said remaining two of said taps being electrically connected to the other ends of a respective one of said coil windings.

15. A coil winding arrangement for a rotating electrical machine as set forth in claim 14 wherein one of the other two taps is electrically connected to an extension of the coil winding formed around a pole tooth circumferentially spaced from the pole tooth where the remaining tap of the other two taps is located.

\* \* \* \* \*